United States Patent [19]

Shim

[11] 4,359,452
[45] Nov. 16, 1982

[54] PROCESS FOR THE PRODUCTION OF INSOLUBLE SULFUR

[75] Inventor: Kyung S. Shim, Irvington, N.Y.

[73] Assignee: Stauffer Chemical Company, Westport, Conn.

[21] Appl. No.: 214,945

[22] Filed: Dec. 10, 1980

[51] Int. Cl.$^3$ .............................................. C01B 17/12
[52] U.S. Cl. ................................ 423/567 R; 423/265; 423/267
[58] Field of Search ....................... 423/265, 267, 567; 23/294 S

[56] References Cited

U.S. PATENT DOCUMENTS 2,419,310  4/1947  Belchetz ............................ 23/294 S
2,757,075  7/1956  Haimsohn ............................ 423/567

OTHER PUBLICATIONS

Fannelli, R., "Ind. & Eng. Chem.", vol. 38, No. 1, Jan. 1946, pp. 39–43.
Fehnel, E. A., "JACS", v. 64, 1942, 3041–3042.

*Primary Examiner*—G. O. Peters

[57] ABSTRACT

A novel process for the preparation of insoluble sulfur product comprises the steps of vaporizing sulfur, mixing the vaporized sulfur with from about $1\times10^{-6}$ % to about 5% hydrogen sulfide, in the essential absence of hydrocarbon oil, quenching the vaporized sulfur in a quenching medium and separating the insoluble sulfur product from the quenching medium.

5 Claims, No Drawings

PROCESS FOR THE PRODUCTION OF INSOLUBLE SULFUR

BACKGROUND OF THE INVENTION

The present invention relates to an improved method for producing insoluble sulfur product. More particularly the present invention relates to a process wherein the sulfur being processed has improved flow characteristics, the product produced has improved stability and wherein the coproduction of tailings is virtually eliminated.

Insoluble sulfur is, by definition, sulfur which is insoluble in carbon disulfide. This form of sulfur is generally understood to be polymeric in nature, the polymer chains being made up of up to several thousand sulfur atoms. Insoluble sulfur is distinguished from soluble sulfur, which is crystalline in form.

The term "insoluble sulfur product", as used herein, means a product which is predominantly insoluble sulfur, but which may and usually does contain some soluble sulfur. The amount of soluble sulfur present in an insoluble sulfur product is usually less than about 10%. As a practical matter, most commercial grades of insoluble sulfur contain some soluble sulfur and are therefore insoluble sulfur products, as that term is used herein.

The most important use for insoluble sulfur product is as a vulcanizing agent in the rubber-making industry. In this industry, sulfur is used as a crosslinking (vulcanizing) agent in rubber compound formulations.

For use in rubber compounding, it is generally preferred that the sulfur be in the form of fine particulate matter wherein the individual particles are no greater in size than about 200 microns in their largest dimension. This fine consistency is desired because it facilitates the uniform distribution of the sulfur throughout the rubber formulation.

The basic process by which insoluble sulfur product is prepared is old and well-known in the art. This basic process comprises heating a sulfur product to vaporize it, and then quenching it in carbon disulfide. Most of the soluble sulfur goes into solution in the carbon disulfide, while the insoluble sulfur is solidified and becomes suspended in the carbon disulfide. The resulting insoluble sulfur product particles are then removed from the carbon disulfide by filtration, centrifugation or the like; and are subsequently washed with carbon disulfide to remove additional amounts of soluble sulfur, and dried.

The carbon disulfide solution of soluble sulfur is then heated to evaporate the carbon disulfide, which is recovered and recycled. The soluble sulfur which remains after the carbon disulfide is evaporated is remelted and charged back to the beginning of the process.

In an improved process, small amounts of a hydrocarbon oil are added as a processing aid to the sulfur before it is vaporized. This oil addition seems to improve the flow characteristics of the material being processed so that there are less problems with "slugging" in the process conduits than is the case without the oil. In addition, the use of the hydrocarbon oil appears to improve the stability of the final product.

It has been postulated that the improvements associated with the oil addition are actually due to the presence of hydrogen sulfide, which is generated by a reaction between the hydrocarbon oil and sulfur.

The use of hydrocarbon oil addition, however, can have an adverse effect on product quality. The hydrocarbon oil can degrade during the processing of the sulfur in which case the degraded oil will appear as a contaminant in the final product in the form of fine black specks.

While the major amount of insoluble sulfur product which is generally produced by the processes just described is usually in the fine particulate form desired for rubber processing, a small proportion, ranging up to about 20% by weight, can consist of particles which are undesirably large (i.e., over about 200 microns). These particles, called "tailings" are separated from the bulk of the product and recycled back to the process. The coproduction of such tailings therefore can represent a loss of production capacity.

A need therefiore exists for an improved process for producing insoluble sulfur product wherein improved product handling characteristics and product stability similar to that available through the use of hydrocarbon oil addition are achieved without contaminating the product with black specks; and wherein the coproduction of tailings is virtually eliminated.

SUMMARY OF THE INVENTION

It has now been found that the addition of hydrogen sulfide to the sulfur being processed, in the essential absence of hydrocarbon oil, improves the flow characteristics of the material being processed, improves the stability of the final insoluble sulfur product and virtually eliminates the coproduction of tailings, without contaminating the final product with black specks.

DETAILED DESCRIPTION OF THE INVENTION

In accordance with the present invention there is provided a process for the preparation of an insoluble sulfur production comprising the steps of vaporizing sulfur, mixing the vaporized sulfur with externally supplied hydrogen sulfide in an amount ranging from about $1 \times 10^{-6}\%$ to about 5% by weight of sulfur and in the essential absence of hydrocarbon oil, quenching the vaporized sulfur in a quenching medium and separating the insoluble sulfur product from the quenching medium.

The sulfur vapor may be prepared by various conventional techniques. In a preferred method, the sulfur is first melted and then passed through a tubular coil running through a furnace. As the sulfur passes through the furnace coils, it is vaporized. The temperature of the sulfur vapor exiting the furnace is preferably controlled at about 500° C. or higher. Temperature control can be achieved by varying the intensity of the heating media as well as by varying the throughput rate of the sulfur.

The amount of hydrogen sulfide used ranges from about $1 \times 10^{-6}\%$ to about 5% by weight of sulfur, although a range of about $1 \times 10^{-5}\%$ to about 1% is preferred.

The hydrogen sulfide may be mixed with the sulfur in various ways. It may, for example, be added directly to the sulfur before it is vaporized, or it may be added to the quenching medium. Preferably, however, it is injected directly into the molten sulfur before the molten sulfur is vaporized. The hydrogen sulfide may, therefore, be conveniently injected directly into the molten sulfur at or near the point where the molten sulfur enters the furnace. The hydrogen sulfide injection rate can be metered and regulated by conventional means to assure that it is injected in the proper amount.

The mixture of sulfur vapor and hydrogen sulfide gas leaving the furnace is then directed to a quenching medium. Although other quenching media, such as water, can be used, carbon disulfide is particularly preferred. Carbon disulfide is preferred because of the tendency of insoluble sulfur to become suspended in it, and that of soluble sulfur to go into solution with it. Separation of the suspended matter from the carbon disulfide solution will therefore yield an insoluble sulfur product having a very high content of insoluble sulfur.

The suspended insoluble sulfur product may be easily separated from the carbon disulfide solution by filtration, centrifugation and the like.

The separated insoluble sulfur product may then be optionally washed with carbon disulfide to remove additional amounts of soluble sulfur, and then dried.

I claim:

1. A process for the preparation of a stable insoluble sulfur product having improved flow characteristics and containing substantially no tailings which comprises forming a mixture of vaporized sulfur with hydrogen sulfide in an amount ranging from about $1 \times 10^{-6}\%$ to about 5% hydrogen sulfide by weight of sulfur and in the essential absence of hydrocarbon oil, quenching said mixture in a quenching medium to form said insoluble sulfur product and separating said insoluble sulfur product from said quenching medium.

2. The process of claim 1 wherein the mixing of said vaporized sulfur and said hydrogen sulfide is accomplished by injecting a stream of hydrogen sulfide into said sulfur before said sulfur is vaporized.

3. The process of claim 1 wherein the mixing of said vaporized sulfur and said hydrogen sulfide is accomplished by injecting hydrogen sulfide into said quenching medium.

4. The process of claim 1 wherein said quenching medium is a medium selected from the group consisting of water and carbon disulfide.

5. The process of claim 4 wherein said medium is carbon disulfide.

* * * * *